United States Patent [19]
Hill et al.

[11] Patent Number: 5,690,011
[45] Date of Patent: Nov. 25, 1997

[54] HYDRAULIC DOUBLE-CUT TUBE CUTOFF

[76] Inventors: Donald R. Hill; James A. Gafkowski, both of c/o Hill Engineering, 930 N. Villa Ave., Villa Park, Ill. 60181

[21] Appl. No.: 540,015

[22] Filed: Oct. 6, 1995

[51] Int. Cl.[6] .................................................. B23D 21/00
[52] U.S. Cl. ........................... 83/319; 83/320; 83/382
[58] Field of Search ........................... 83/318, 319, 320, 83/862, 385, 382

[56] References Cited

U.S. PATENT DOCUMENTS

| | | | |
|---|---|---|---|
| Re. 22,114 | 6/1942 | Borzym | 164/49 |
| Re. 30,025 | 6/1979 | Borzym | 83/319 |
| 2,186,061 | 1/1940 | Berg et al. | 164/60 |
| 2,198,599 | 4/1940 | Borzym | 164/49 |
| 2,234,999 | 3/1941 | Yoder | 164/87 |
| 2,243,614 | 5/1941 | Vogel | 164/48 |
| 2,572,137 | 10/1951 | Grieder | 164/49 |
| 2,741,309 | 4/1956 | Czarnik | 83/319 |
| 3,121,360 | 2/1964 | Hill | 83/292 |
| 3,129,624 | 4/1964 | Auer | 83/300 |
| 3,143,018 | 8/1964 | Everett | 83/214 |
| 3,173,318 | 3/1965 | Lindemann | 82/47 |
| 3,273,433 | 9/1966 | Borzym | 83/54 |
| 3,288,011 | 11/1966 | Borzym | 83/310 |
| 3,288,012 | 11/1966 | Borzym | 83/310 |
| 3,301,115 | 1/1967 | Walsh | 83/314 |
| 3,340,756 | 9/1967 | Mize | 83/320 |
| 3,460,421 | 8/1969 | Borzym | 83/311 |
| 3,600,991 | 8/1971 | Kojima et al. | 82/53.1 |
| 3,611,848 | 10/1971 | Sullivan et al. | 82/53.1 |
| 3,698,274 | 10/1972 | Coulon et al. | 83/188 |
| 3,717,058 | 2/1973 | McMinn | 83/157 |
| 3,771,393 | 11/1973 | Gatto et al. | 82/53.1 |
| 3,921,820 | 11/1975 | Crockett | 214/1 BB |
| 3,924,502 | 12/1975 | Borzym | 83/454 |
| 3,958,467 | 5/1976 | Borzym | 76/107 R |
| 4,015,496 | 4/1977 | Hill | 83/466.1 |
| 4,031,792 | 6/1977 | Borzym et al. | 83/601 |
| 4,036,091 | 7/1977 | Borzym | 83/319 |
| 4,055,096 | 10/1977 | Borzym | 83/37 |
| 4,055,100 | 10/1977 | Borzym | 83/454 |
| 4,084,463 | 4/1978 | Kanbara et al. | 82/53.1 |
| 4,108,029 | 8/1978 | Borzym | 83/54 |
| 4,109,555 | 8/1978 | Borzym | 83/700 |
| 4,193,486 | 3/1980 | Borzym et al. | 193/35 R |
| 4,228,706 | 10/1980 | Borzym | 83/320 |
| 4,294,147 | 10/1981 | Borzym | 83/382 |
| 4,301,723 | 11/1981 | Borzym | 100/271 |

(List continued on next page.)

OTHER PUBLICATIONS

Robonex "Hydra–Shear Flying Cutoffs For Roll Forming and Bi–Laminate Extrusion Lines" advertising leaflet.
Robonex "The Dimple Free Flying Hydra–Shear For Pipe and Tubing Mills" advertising leaflet.
*Modern Metals* / Jan. 1995: American Machine & Rollform Tech, Inc. advertisement.
*Tube & Pipe Technology* / Jan./Feb. 1995: Nakata–Nodic Flying Cutoff advertisement.

*Primary Examiner*—Maurina T. Rachuba
*Attorney, Agent, or Firm*—Wood, Phillips, VanSanten, Clark & Mortimer

[57] ABSTRACT

In accordance with the present invention, an apparatus is provided for cutting a workpiece moving in a predetermined path relative to a support. The apparatus includes a carriage and linear bearings for mounting the carriage to a support for movement relative to the support to follow movement of the workpiece as it moves in a predetermined path. A clamp is provided on the carriage for clamping the workpiece to the carriage, the clamp having an open position and a closed position. A scarf cutter movable between a first position and a second position is also provided on the carriage for making a scarf cut in the workpiece. A mechanism is provided between the scarf cutter and the clamp for moving the clamp from its open position to its closed position as an incident of the scarf cutter moving from its first position towards its second position, and, in one form of the invention, for moving the clamp from its closed position to its open position as an incident of the scarf cutter moving from its second position towards its first position.

22 Claims, 6 Drawing Sheets

U.S. PATENT DOCUMENTS

| | | | |
|---|---|---|---|
| 4,315,449 | 2/1982 | Borzym | 83/319 |
| 4,337,680 | 7/1982 | Borzym | 83/456 |
| 4,350,065 | 9/1982 | Hayashi et al. | 83/287 |
| 4,354,409 | 10/1982 | Riera et al. | 83/285 |
| 4,376,401 | 3/1983 | Borzym | 83/319 |
| 4,392,644 | 7/1983 | Borzym | 269/157 |
| 4,411,182 | 10/1983 | Borzym | 83/319 |
| 4,437,374 | 3/1984 | Borzym | 83/454 |
| 4,457,200 | 7/1984 | Borzym | 83/862 |
| 4,462,529 | 7/1984 | Ladouceur | 226/125 |
| 4,497,230 | 2/1985 | Sheilds | 83/318 |
| 4,499,803 | 2/1985 | Borzym et al. | 83/319 |
| 4,542,670 | 9/1985 | Borzym | 83/295 |
| 4,562,760 | 1/1986 | Kinsley | 83/693 |
| 4,563,927 | 1/1986 | Kinsley | 83/319 |
| 4,614,139 | 9/1986 | Borzym | 83/300 |
| 4,624,168 | 11/1986 | Borzym | 83/862 |
| 4,631,998 | 12/1986 | Borzym | 83/145 |
| 4,635,514 | 1/1987 | Borzym | 83/196 |
| 4,637,287 | 1/1987 | Kusakabe | 83/319 |
| 4,646,601 | 3/1987 | Borzym | 83/385 |
| 4,653,368 | 3/1987 | Riera et al. | 83/319 |
| 4,694,718 | 9/1987 | Kinsley | 83/319 |
| 4,709,845 | 12/1987 | Akiyama et al. | 228/17 |
| 4,727,783 | 3/1988 | John, Jr. | 82/53.1 |
| 4,766,792 | 8/1988 | Borzym et al. | 83/319 |
| 4,796,498 | 1/1989 | Borzym | 83/49 |
| 4,807,502 | 2/1989 | Clark et al. | 82/53.1 |
| 4,848,723 | 7/1989 | Borzym | 269/157 |
| 4,865,300 | 9/1989 | Borzym | 269/13 |
| 4,872,384 | 10/1989 | Borzym | 83/454 |
| 4,903,822 | 2/1990 | Borzym | 198/624 |
| 4,909,110 | 3/1990 | Borzym | 83/319 |
| 4,932,297 | 6/1990 | Borzym et al. | 83/319 |
| 4,939,967 | 7/1990 | Wallis | 83/150 |
| 4,951,538 | 8/1990 | Borzym | 83/388 |
| 4,964,325 | 10/1990 | Hartmann, Jr. et al. | 83/321 |
| 4,964,327 | 10/1990 | Nolan et al. | 83/698 |
| 4,964,328 | 10/1990 | Nolan et al. | 83/698 |
| 4,966,061 | 10/1990 | Riera et al. | 83/862 |
| 4,979,410 | 12/1990 | Kusakabe | 83/37 |
| 4,993,297 | 2/1991 | Nolan et al. | 83/698 |
| 4,993,298 | 2/1991 | Chamulak et al. | 83/698 |
| 5,003,853 | 4/1991 | Borzym et al. | 83/318 |
| 5,005,692 | 4/1991 | Borzym | 198/624 |
| 5,009,140 | 4/1991 | Nolan et al. | 83/698 |
| 5,016,507 | 5/1991 | Riera et al. | 83/384 |
| 5,074,143 | 12/1991 | Nolan et al. | 72/446 |
| 5,076,125 | 12/1991 | Riera et al. | 83/285 |
| 5,088,365 | 2/1992 | Nolan | 83/300 |
| 5,105,700 | 4/1992 | Kusakabe | 83/318 |
| 5,125,306 | 6/1992 | Borzym | 83/319 |
| 5,140,123 | 8/1992 | Mitani | 219/61.2 |
| 5,157,999 | 10/1992 | Borzym | 83/37 |
| 5,161,444 | 11/1992 | Kusakabe et al. | 83/319 |
| 5,191,822 | 3/1993 | Borzym | 83/466 |
| 5,224,368 | 7/1993 | Schach | 72/185 |
| 5,231,908 | 8/1993 | Skvarce et al. | 83/698 |
| 5,347,901 | 9/1994 | Borzym | 83/320 |
| 5,361,662 | 11/1994 | Levy | 83/308 |
| 5,365,818 | 11/1994 | Levy | 83/308 |
| 5,373,764 | 12/1994 | Borzym | 83/385 |
| 5,383,381 | 1/1995 | Graham | 83/385 |
| 5,553,526 | 9/1996 | Kusakabe et al. | 83/385 |

HYDRAULIC DOUBLE-CUT TUBE CUTOFF

FIELD OF THE INVENTION

This invention relates to tube cutoff apparatus, and more particularly, to an apparatus and method for double-cutting a stationary or continuous moving length of tube.

BACKGROUND OF THE INVENTION

Double-cut dies for making a "flying cutoff" of a continuous length of tubing are well known in the prior art. Certain of these dies are mounted on mechanical ram machines which apply a vertically downward force to the die which effects a horizontal scarf cut followed by a vertical finish cut. Typically, these dies employ vertically moving cams to both effect the horizontal scarf cut and actuate a clamp which clamps the tube to the die.

A disadvantage of these dies is the wear of the die associated with the continuously cam-driven tube clamp and horizontally moving scarfing cutter. The cam must convert the vertical downward force of the mechanical ram into horizontal clamping and scarfing cut forces. This transmission of forces results in wear on the cam surfaces and on the cam followers. The wear is especially critical for the tube clamp because it can result in a lessening of the clamping forces.

A specific disadvantage of certain cam-driven tube clamps is the relatively long cam surfaces required for proper operation of the clamp. Because the tube clamp must be continuously forced into the clamped position by the cams, the cam surface must have a length equal to the stroke of the horizontal cut plus an initial length to effect clamping prior to the initiation of the horizontal scarfing cut. The length of the cams adds mass to the die, making it more difficult to accelerate and decelerate the die as it performs tube cuts on a continuously fed length of tubing. Additionally, sufficient clearance must be provided within the tube cutting apparatus to allow for the stroke of the cams as the die moves along the path of the tube. The required clearance limits flexibility in the arrangement of the tube cutting apparatus components relative to each other and in the placement of the tube cutting apparatus itself.

Another disadvantage of these dies is that they may require a massive and relatively expensive mechanical ram machine for their operation. Such ram machines commonly incorporate a motor driving a flywheel which is selectively engaged by a clutch to a crank mechanism which translates the rotational energy of the flywheel into vertically downward forces and movement. Due to their complexity and large number of moving parts, such rams may be expensive to purchase and maintain. Additionally, because of their overall size and the mass, such machines may be relatively immobile.

In response to the disadvantages associated with the use of the mechanical ram machines, hydraulically-actuated cylinders have been utilized to supply the cutting and clamping forces required for the flying tube cutoff. Some current devices mount the hydraulic cylinders on a carriage which is capable of translating with the continuously-fed tube. These devices employ a separate hydraulic cylinder for each of the required cutting and clamping functions. Thus, a typical device may have an hydraulic cylinder for actuating the tube clamp, an hydraulic cylinder for actuating the scarfing cut, and an hydraulic cylinder for actuating the finishing cut.

There are a number of disadvantages associated with employing a dedicated hydraulic cylinder for supplying the clamping force. First, there is the additional expense associated with the cost of the dedicated cylinder and the associated hydraulic lines, valves and controls which must also be provided. Second, the dedicated cylinder and its associated hydraulic system adds additional mass to the carriage which must be accelerated and decelerated continuously as the tube cutoff is performed on the continuously-fed tube. Third, because the dedicated cylinder requires a continuous supply of hydraulic pressure to maintain its clamping force on the tube, the tube is subject to undesirable slippage through the clamp if the hydraulic pressure varies beyond acceptable limits. Thus, special provisions must be made in the hydraulic system to ensure that such pressure variations do not occur, while also ensuring that there is a sufficient supply of hydraulic flow and pressure to actuate the hydraulic cylinders dedicated to the scarf cut and the finish cut. Fourth, a larger capacity hydraulic system must be provided than otherwise would be required absent the use of a dedicated cylinder for the tube clamp. Finally, because the valves for each of the three cylinders are typically signaled in sequence, the cycle time of the system is increased, thereby slowing the entire process down.

SUMMARY OF THE INVENTION

In accordance with the present invention, an apparatus is provided for cutting a workpiece moving in a predetermined path relative to a support. The apparatus includes a carriage and linear bearings for mounting the carriage to a support for movement relative to the support to follow movement of the workpiece as it moves in a predetermined path. A clamp is provided on the carriage for clamping the workpiece to the carriage, the clamp having an open position and a closed position. A scarf cutter movable between a first position and a second position is also provided on the carriage for making a scarf cut in the workpiece. A mechanism is provided between the scarf cutter and the clamp for moving the clamp from its open position to its closed position as an incident of the scarf cutter moving from its first position towards its second position and, in one form of the invention, for moving the clamp from its closed position to its open position as an incident of the scarf cutter moving from its second position towards its first position.

In one form of the invention, a finish cutter is provided for making a finish cut in a workpiece.

In one form of the invention, an apparatus is provided having a carriage, and linear bearings for mounting the carriage to a support for movement relative to the support to follow movement of a workpiece moving in a predetermined path. A clamp is provided on the carriage for clamping a workpiece to the carriage, the clamp having an open position and a closed position. An actuator is provided on the carriage for selectively applying an actuating force which is transmitted to the clamp by a mechanism for urging the clamp to the closed position. A lock is provided for maintaining the clamp in the closed position in the absence of an actuating force being applied by the actuator.

In one form of the invention, the actuator includes a scarf cutter for making a scarf cut in a workpiece.

In one form of the invention, an apparatus is provided having a carriage and linear bearings for mounting the carriage to a support for movement relative to the support to follow movement of a workpiece moving in a predetermined path. A clamp is provided on the carriage for clamping a workpiece to the carriage, the clamp having an open position and a closed position. The clamp includes a surface to forcibly engage a workpiece in the operative position with the clamp in the closed position to thereby apply a clamping force between the clamp and the workpiece. An actuator is provided on the carriage for applying an actuating force to a control mechanism which controls the position of the clamp in response to either the actuating force or the clamping force. The control mechanism includes cams and linkages for moving the clamp between the open and closed positions in response to the actuating force being applied to the control mechanism. The control mechanism further includes a stop cooperating with the linkages to prohibit the clamp from moving from the closed position into the open position in response to the clamp force being applied to the clamp.

In one form of the invention, an apparatus for cutting a workpiece is provided having a frame, and a clamp on the frame for clamping the workpiece to the frame, the clamp having an open position and a closed position. A scarf cutter movable between a first position and a second position is also provided on the frame for making a scarf cut in the workpiece. A mechanism is provided between the scarf cutter and the clamp for moving the clamp from its open position to its closed position as an incident of the scarf cutter moving from its first position towards its second position.

In one form of the invention, the mechanism locks the clamp in the closed position as an incident of the clamp being moved from its open position to its closed position and unlocks the clamp in the closed position as an incident of the scarf cutter moving from its second position towards its first position.

In one form of the invention, a selective locking mechanism is provided for locking and unlocking the clamp in the closed position as an incident of the scarf cutter moving between its first and second positions.

In one form of the invention, an apparatus for cutting a workpiece is provided having a frame and a clamp on the frame for clamping the workpiece to the frame, the clamp having an open position and a closed position. An actuator is provided on the frame for selectively applying an actuating force which is transmitted to the clamp by a mechanism for urging the clamp to the closed position. The actuator includes a cutter for making a cut in a workpiece clamped by the clamp. A lock is provided for maintaining the clamp in the closed position in the absence of an actuating force being applied by the actuator.

In one form of the invention, a second lock is provided for maintaining the clamp in the closed position in the absence of an actuating force being applied by the actuator.

In one form of the invention, the mechanism includes a slider crank mechanism, and the lock includes a stop to limit rotation of the slider crank mechanism in a first direction.

In one form of the invention, the slider crank mechanism rotates in a first direction when the clamp moves from the open position to the closed position.

In one form of the invention, the lock includes a locking lever selectively engageable with the mechanism to maintain the clamp in a closed position, and cam surfaces cooperating between the actuator and the lock for selectively engaging the locking lever with the clamp.

In one form of the invention, an apparatus for cutting a workpiece is provided having a frame and a clamp on the frame for clamping a workpiece to the frame in an operative position, the clamp having an open position and a closed position. The clamp includes a surface to forcibly engage a workpiece in the operative position with the clamp in the closed position to thereby apply a clamping force between the clamp and the workpiece. An actuator is provided on the frame for applying an actuating force to a control mechanism which controls the position of the clamp in response to either the actuator force or the clamping force. The actuator includes a cutter for making a cut in a workpiece clamped in the operative position by the clamp. The control mechanism includes cams and linkages for moving the clamp between the open and closed positions in response to the actuating force being applied to the control mechanism. The control mechanism further includes a stop cooperating with the linkages to prohibit the clamp from moving from the closed position into the open position in response to the clamp force being applied to the clamp.

Other objectives, features and advantages of the invention will be apparent from the following detailed description taken in conjunction with the accompanying drawings.

DETAILED DESCRIPTION OF THE PREFERRED EMBODIMENT

Figure 1:
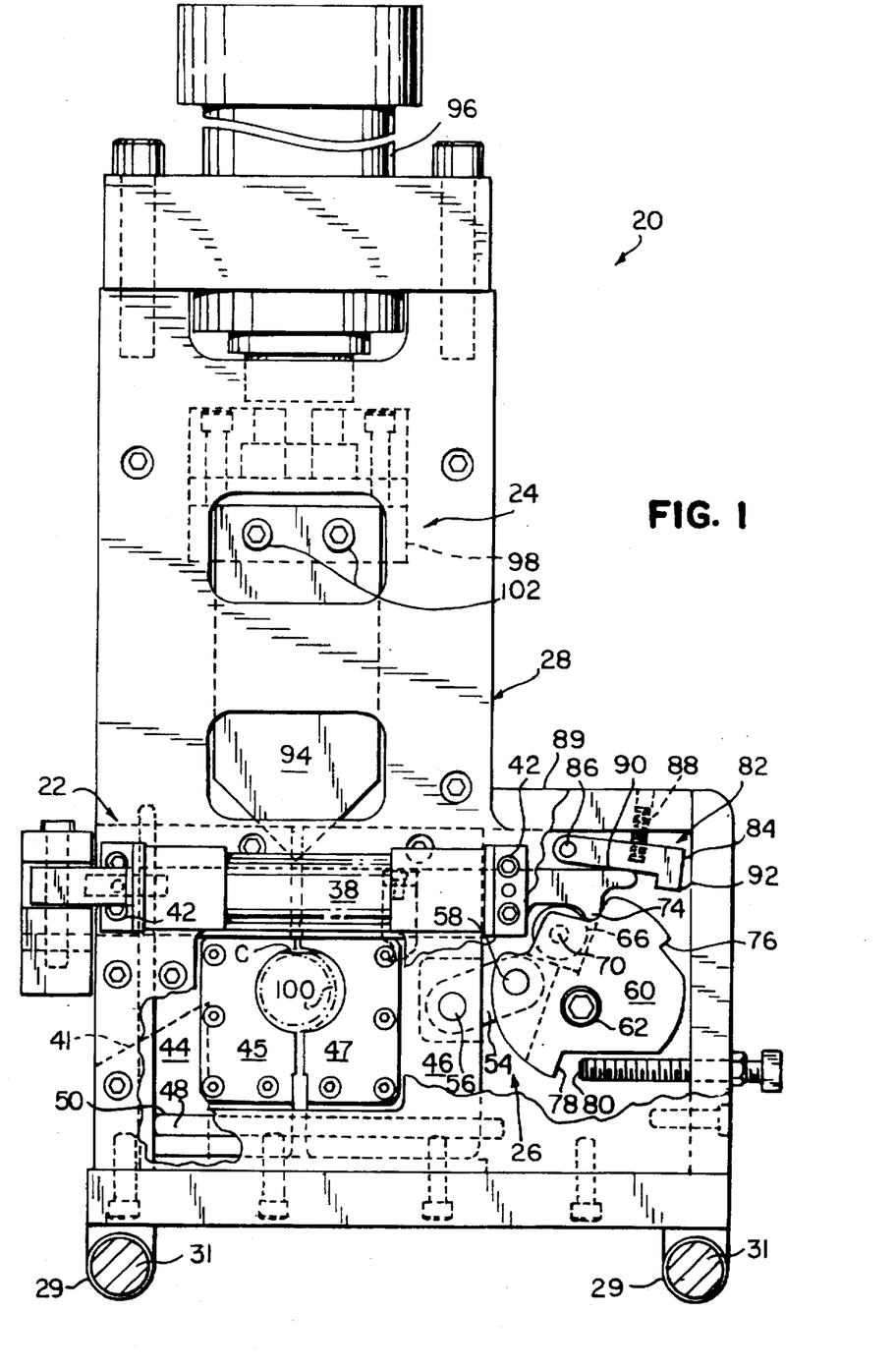
FIG. 1 is a front elevation view of an hydraulically actuated double-cut tube cutoff apparatus embodying the present invention, with portions broken away to reveal interior components.

As shown in the drawings for purposes of illustration, the invention is embodied in a double-cut tube cutoff apparatus 20 for cutting off part of a tubular workpiece 100 moving in a predetermined path relative to a support. As best seen in FIG. 1, the tube cutoff apparatus 20 includes a scarf cut mechanism 22, a finish cutting mechanism 24 and a tube clamp mechanism 26, with each mechanism 22, 24 and 26 being attached to and supported by a tube cutoff frame/carriage 28 which is mounted on linear bearings 29 to a support/base 31. The linear bearings 29 and support/base 31 may be of any form commonly known and employed by those skilled in the art.

Figure 2:
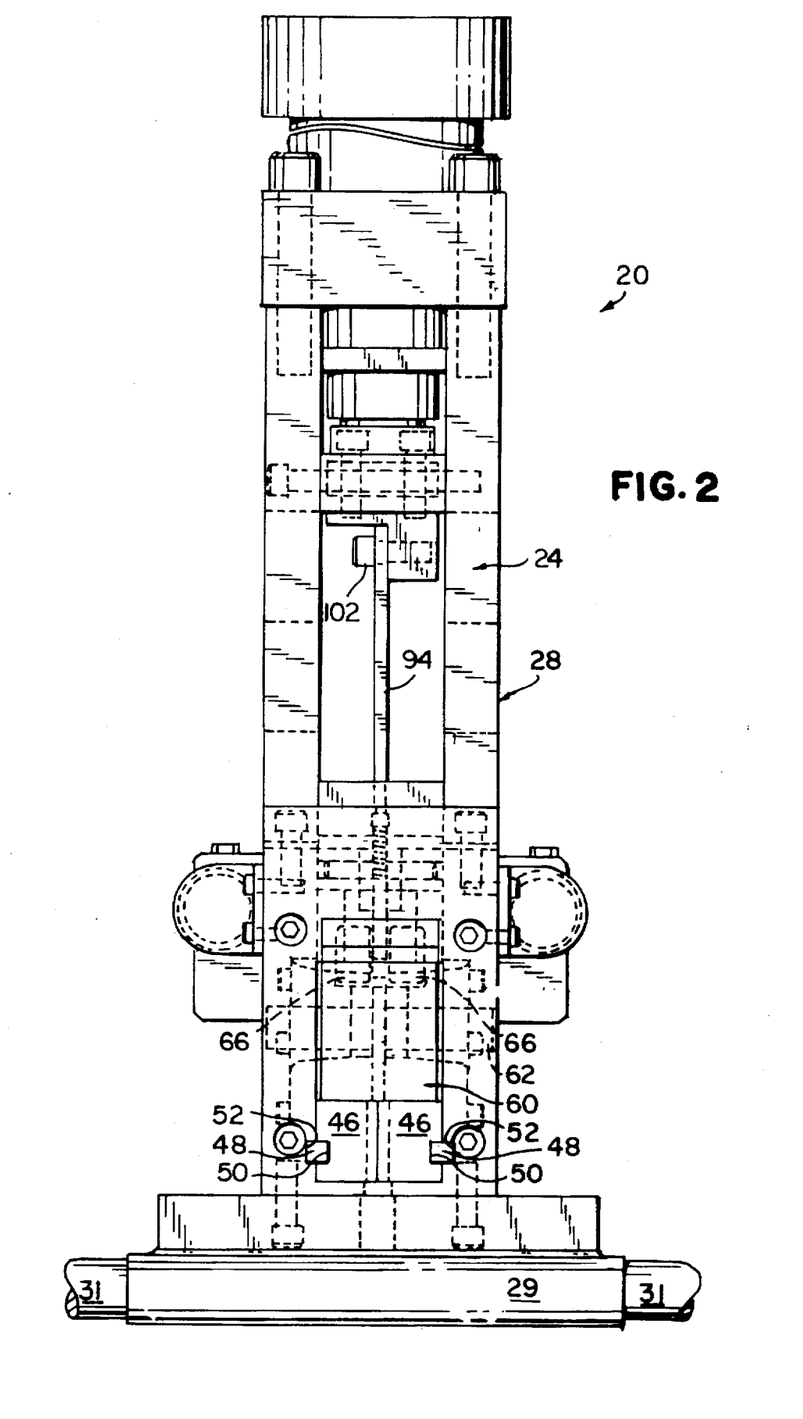
FIG. 2 is a right side elevation view of the tube cutoff apparatus shown in FIG. 1.
Figure 3:
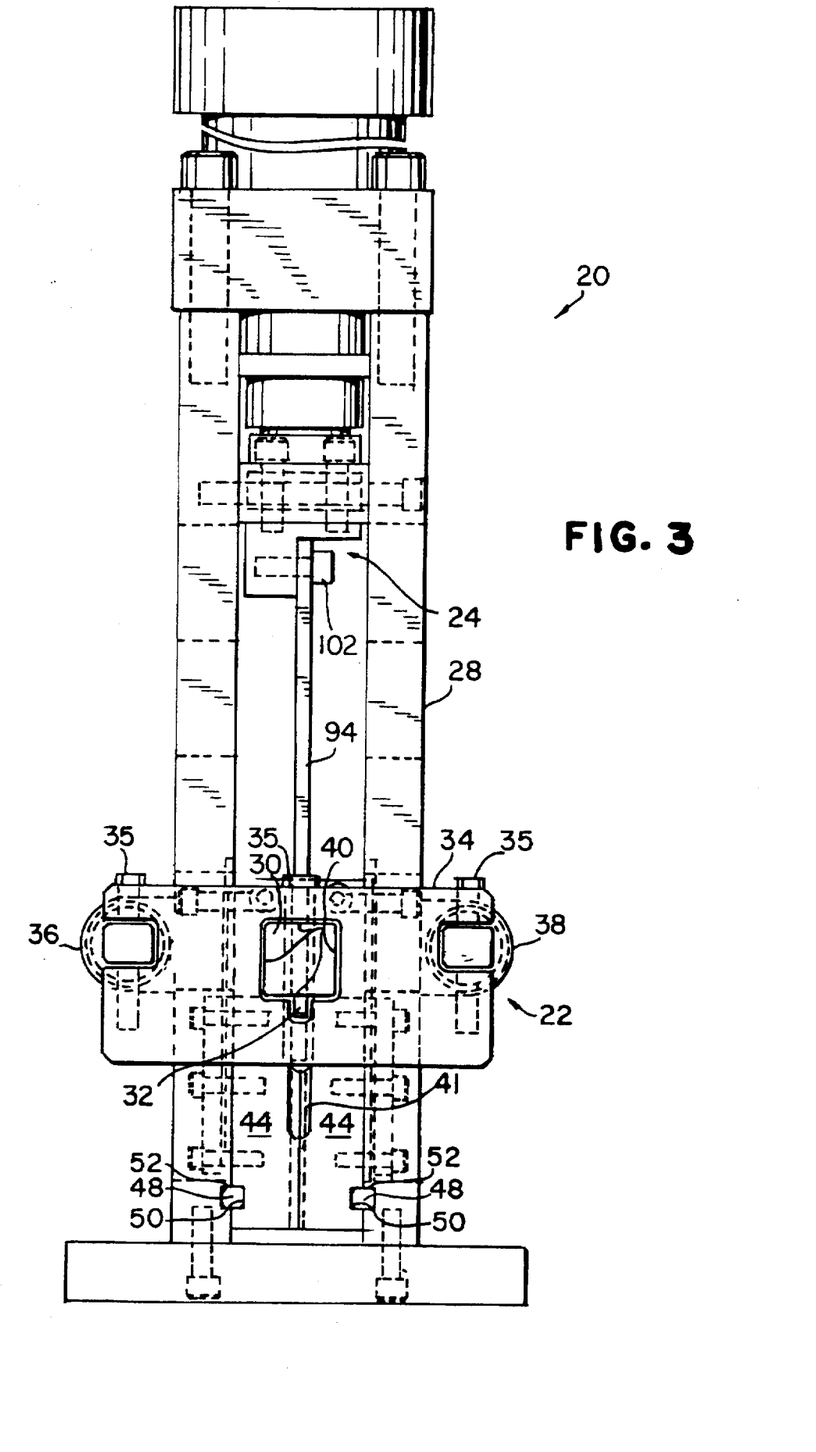
FIG. 3 is a left side elevation view of the tube cutoff apparatus shown in FIG. 1.

As best seen in FIGS. 1–3, the tube clamp mechanism 26 includes a stationary clamp block 44, and a translating clamp block 46 carried on gibs 48 guidable slidingly against linear ways 50 and 52 formed in the clamp blocks 44 and 46 and the frame 28, respectively. A connecting link 54 has an end joined to the clamp block 46 by a pivot pin 56, with the opposite end of the connecting link 54 being connected by pivot pin 58 to a rotating block 60 which is in turn mounted to the frame 28 by a pivot pin 62. Taken in combination, the frame 28, the clamp block 46, the connecting link 54, and the rotating block 60 form a centered slider-crank mechanism, which operates to translate the clamp block 46 relative to the frame 28 in response to rotation of the block 60. Clamping means in the form of replaceable jaw inserts 45 and 47 are provided on the clamp blocks 44 and 46, respectively, for engagement with a tube/workpiece 100. The jaw inserts 45 and 47 are provided in several different configurations, with each configuration being specific to a particular tube size and shape.

As best seen in FIG. 3, the scarf cut mechanism 2 includes a scarfing tool holder 30 which guides the scarfing tool 32 during the scarfing cut. A yoke 34 connects the tool holder 30 to two scarfing tool force cylinders 36 and 38 which drive the scarfing tool 32 and the tool holder 30 between a first position wherein the scarfing tool 32 is situated to initiate a scarf cut and a second position, wherein the scarfing tool 32 has finished a scarf cut. Shouldered fasteners 35 pivotably connect each of the force cylinders 36 and 38 and the tool holder 30 to the yoke 34. As best been in FIG. 1, the scarfing tool drive cylinders 36 and 38 are connected to the frame 28 by suitable fasteners 42.

Figures 5, 6:
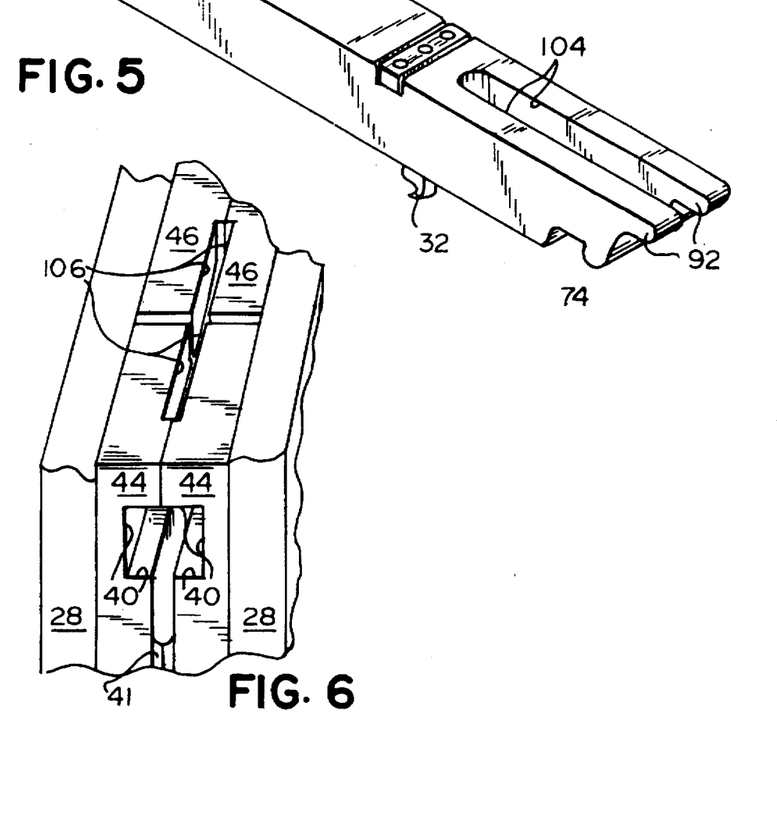
FIG. 5 is a perspective view of a scarf cut tool holder removed from the tube cutoff apparatus shown in FIG. 1.
FIG. 6 is a partial left side view of the tube cutoff apparatus shown in FIG. 1 with selected elements removed.

As best seen in FIG. 6, the tool holder 30 is guided for translational movement relative to the frame 28 by guide surfaces 40 in the clamp blocks 44 and 46. These surfaces 40 eliminate the need for separate, dedicated components on the frame 28 for guiding the scarfing tool 32. Thus, the accuracy of the scarfing tool position relative to the clamped position of the tube 100 has been maximized by eliminating the error associated with the tolerance stack-up of multiple components.

It will further be appreciated that the two-piece construction of each clamp block 44 and 46 allows for the accurate formation of the guide surfaces 40 relative to the jaw inserts 45 and 47 by standard machining methods.

A chip channel 41 has been provided in the clamp block 44 to guide machining debris generated by the scarfing cut away from the tube 100 and the tube cutoff apparatus 20.

Figure 4:
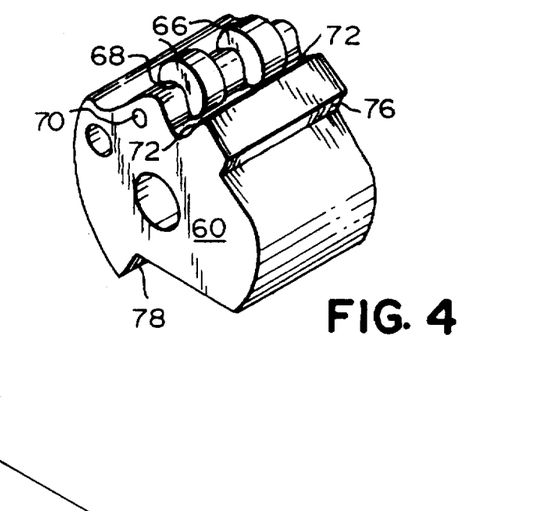
FIG. 4 is a perspective view of a tube clamp element removed from the tube cutoff apparatus shown in FIG. 1.

As best seen in FIG. 4, the rotating block 60 includes a pair of rollers 66 set in slots 68 and mounted for rotation on pins 70. Adjacent to the rollers 66 is a cam surface 72. Both the rollers 66 and the cam surface 72 are selectively engaged by a pair of drive lugs 74 formed on the end of the tool holder 30. The rotating block further includes a catch 76 and a stop surface 78.

Figure 7A:
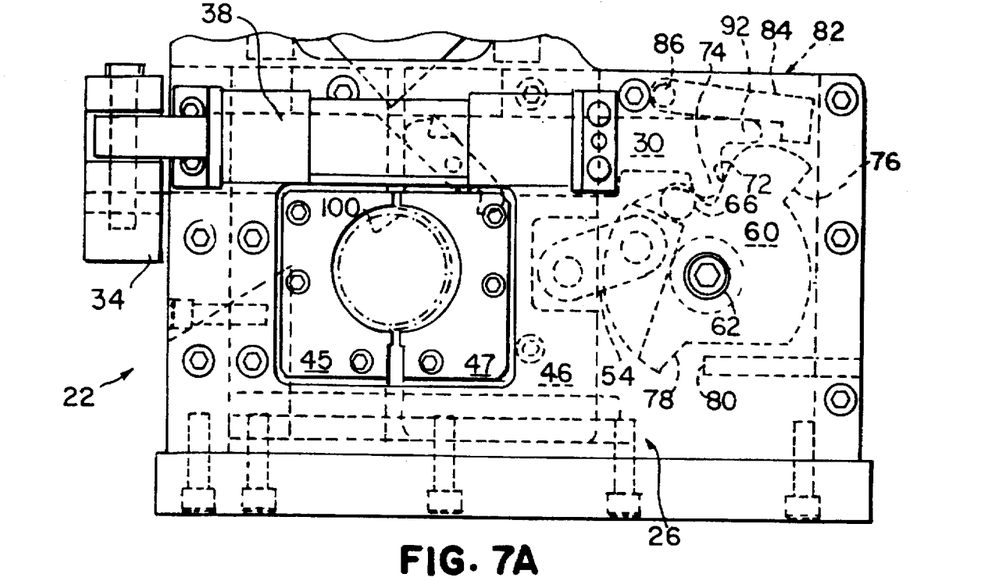
FIG. 7a is a partial front elevation view of the tube cutoff apparatus shown in FIG. 1 with the scarf cut mechanism in a first position and the tube clamp in an open position.
Figure 7B:
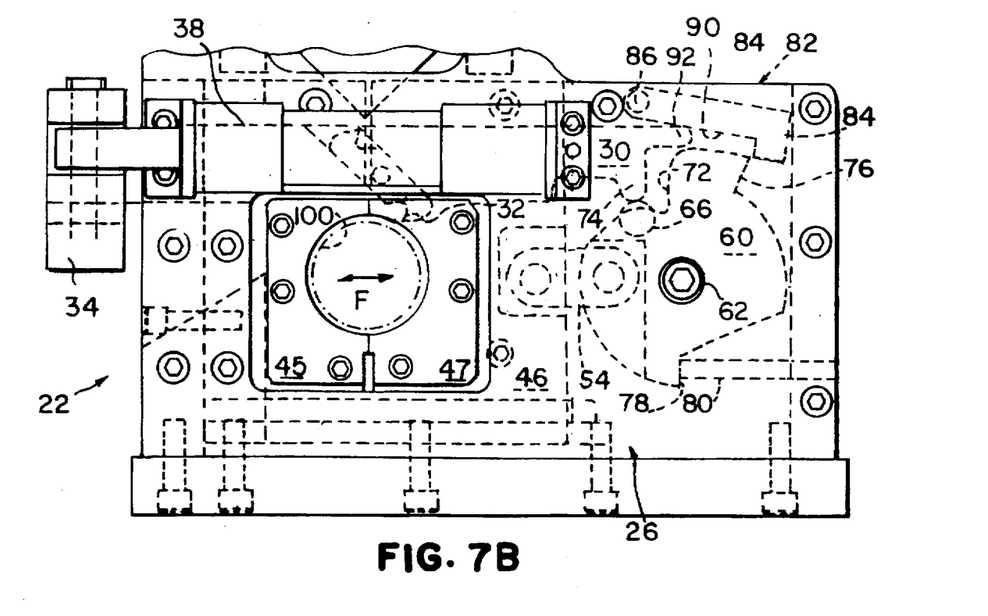
FIG. 7b is a partial front elevation view of the tube cutoff shown in FIG. 1 with the scarf cut mechanism moving from its first position towards a second position and with the tube clamp moving from its open position to its closed position.

The clamp mechanism 26 and the scarf cut mechanism 22 cooperate as follows. When the tube cutoff apparatus 20 is ready to initiate a cut, the tube clamp mechanism 26 is in the open position and the scarf cut mechanism 22 is in a first position, as shown in FIGS. 1 and 7a. The scarfing tool force cylinders 36 and 38 are activated and begin to drive the tool holder 30 from the first position towards a second position, as shown in FIG. 7b. At this point, the drive lugs 74 have contacted the rollers 66, thereby initiating counterclockwise rotation of rotating block 60 about the pivot pin 62. The connecting link 54 translates the rotational motion of the block 60 into linear motion of the clamp block 46, thereby driving the clamp block 46 towards the closed position and thereby clamping the tube 100. The driving lugs 74 continue to drive the rotating block 60 through the roller 66 until the rotating block 60 and the connecting link 54 are rotated past centers, at which point a clamping force F, generated at the interface between the jaw inserts 45 and 47 and the tube 100, tends to rotate the block 60 counterclockwise, thereby driving the stop surface 78 into a stop 80, which is fixed to the frame 28, as shown in FIG. 7c.

Figure 7C:
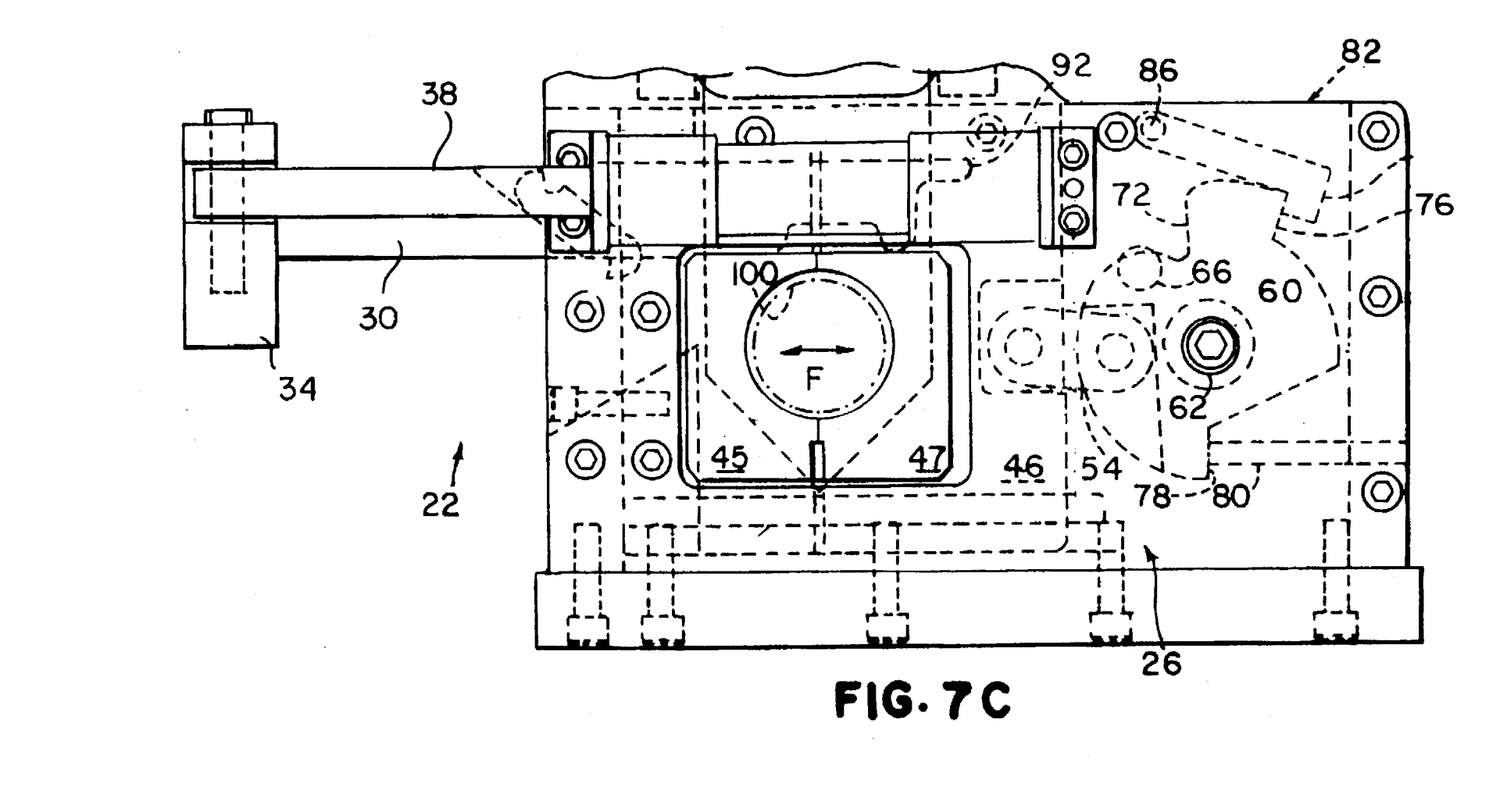
FIG. 7c is a partial front elevation view of the tube cutoff shown in FIG. 1 with the scarf cut mechanism in its second position and the tube clamp in its closed position.

More particularly, as seen in FIG. 7c, the clamping force F tends to drive the clamp block 46 to the right which, in turn, tends to drive the connecting link 54 to the right and to rotate the connecting link 54 clockwise, which in turn tends to rotate the rotating block 60 counterclockwise, thereby driving the stop surface 78 into the stop 80. Thus, it can be seen that the clamping mechanism 26 is self-locking in that after being moved by the scarf cut mechanism 22 into the closed position, the clamp mechanism 26 maintains itself in the closed position against the clamping force F generated at the interface between the jaw inserts 45 and 47 and the tube 100, without requiring an external force generator.

After making the scarf cut and moving fully to the second position, the scarf cut mechanism 22 will be activated for its return stroke, thereby moving the tool holder 30 from the second position to the first position. As the tool holder 30 returns to the first position, the drive lugs 74 contact the cam surface 72, thereby forcing the block 60 to rotate in a clockwise direction about the pivot pin 62. The connecting link 54 will translate the clockwise rotation of the block 60 into linear movement of the clamp block 46 thereby translating the clamp block 46 from the closed position to the open position, as seen in FIGS. 7b and 7a. Thus it can be seen that while the clamp mechanism 26 is impervious to the clamping force F while in the closed position, the clamp mechanism 26 is easily moved from the closed position to the open position when an actuating force is applied to the block 60 as by the tool holder 30.

From the foregoing, it will be appreciated that taken in combination the frame 28, the connecting link 54, the rotating block 60, the stop 80, the tool holder 30 and the pivot pins 56, 58 and 60 operate as means for controlling the position of the clamping means 45,47 in response to either the application of an actuating force from cylinders 36 and 38 or the application of the clamping force F.

As seen in FIG. 1, a lock mechanism 82 is disclosed and includes a lock link 84 which is mounted to the frame 28 by a pivot pin 86. A spring 88 is mounted between the lock link 84 and a cap plate 89 of the frame 28 for biasing the lock link 84 for clockwise rotation about pivot pin 86 towards a locked position, as shown in FIG. 7c. Drive surface 90 is provided on lock link 84 for engagement by drive fingers 92 provided on the end of the tool holder 30. In the first position, the fingers 92 contact the drive surface 90, thereby forcing the lock link 84 into a disengaged position where the lock link 84 does not engage the rotating block 60. As the drive fingers 92 move from the first position towards the second position, the clamp mechanism 26 moves to the closed position, and the fingers 92 disengage from the drive surface 90, thereby allowing the spring 88 to force the lock link 84 into locked engagement with catch 76 on the block 60. Thus, it will be seen that a force which tends to rotate the block 60 in a clockwise rotating will be reacted by the lock link 84, thereby preventing the clamp mechanism 26 from moving from the closed position. On its return stroke from the second position to the first position, the tool holder 30 will drive the drive fingers 92 into the drive surface 90 prior to the drive lugs 74 contacting the cam surface 72, thereby disengaging the lock link 84 from the catch 76 and allowing the block 60 to rotate in the clockwise direction as the drive lugs 74 contact the cam surface 72.

It will be appreciated that either the lock mechanism 82 or the self-locking capabilities of the clamping mechanism 26 may serve as a primary means for maintaining the clamping means 45,47 in the closed position in the absence of an actuating force being applied by force cylinders 36 and 38 through the tool holder 30.

It will be appreciated that the disclosed clamp mechanism 26 provides a mechanical advantage for the actuating force required to move the clamp mechanism 26 to the closed position against the clamping force F. This mechanical advantage approaches infinity as the block 60 and the connecting link 54 approach centers, i.e., as the centers defined by pivot pins 56, 58, and 62 become aligned, and the torque applied to the block 60 as a result of the clamping force F approaches zero.

As best seen in FIG. 1, the finish cutting mechanism includes a finishing tool 94 which is connected to a finishing tool force cylinder 96 by a finishing tool holder 98 for performing a finish cut on a tube 100. Finishing tool 94 is attached to the tool holder 98 by suitable fasteners 102.

Having observed the details of the tube cutoff apparatus 20, attention may now be given to its various methods of operation.

To initiate a cut in accordance with one method, the tube cutoff apparatus 20 is accelerated on the linear bearings 29 by a means well known to those skilled in the art to match speed with the tube 100 as it moves along a predetermined path. As a speed match is achieved, the scarfing tool force cylinders 36 and 38 are initiated to drive the scarfing tool holder 30 and the scarfing tool 32 from the first position towards the second position. As the tool holder 30 moves from the first position towards the second position, it will actuate the clamp mechanism 26 into the closed position, thereby clamping the tube 100 to the tube cutoff apparatus 20. The scarfing tool force cylinders 36 and 38 will then force the scarfing tool 32 to make a scarf cut in the tube 100 as the tool holder 30 moves towards the second position. When the tool holder 30 is completely in the second position, the finishing tool force cylinder 96 will be activated to drive the finishing tool 94 from the upper position towards the lower position to cut the tube 100. As the finishing tool 94 moves towards the lower position and into contact with the tube 100, it will pass through a clearance slot 104 formed in the end of the tool holder 30 and will be guided by guide slots 106 formed in the clamp blocks 44 and 46. As the finishing tool 94 reaches the lower position, the finishing tool force cylinder 96 will be activated to move the finishing tool 94 from the lower position to the upper position. As the finishing tool 94 reaches the upper position, the scarfing tool force cylinders 36 and 38 will be activated to move the tool holder 30 and the scarfing tool 32 from the second position to the first position. As the tool holder 30 approaches the first position, it will unlock the lock mechanism 82 and then actuate the clamp mechanism 26 from the closed position to the open position, thereby releasing the tube 100 from the tube cutoff apparatus 20. After the tube 100 is released, the tube cutoff apparatus 20 will be decelerated and returned to its initial position along the predetermined path in preparation for the next cut.

In accordance with another method of operation, a length of the tube 100 moving in a predetermined path is measured by means well known to those skilled in the art. After a predetermined length of the tube 100 has passed through the tube cutoff apparatus 20, the scarfing tool force cylinders 36 and 38 are initiated to drive the scarfing tool holder and the scarfing tool 32 from the first position towards the second position. As the tool holder 30 moves from the first position towards the second position, it will actuate the clamp mechanism 26 into the closed position, thereby clamping the tube 100 to the tube cutoff apparatus 20. Because the tube 100 and the tube cutoff apparatus 20 are clamped together, the tube cutoff apparatus 20 is accelerated on the linear bearings 29 by the tube 100 along the predetermined path. The scarfing tool drive cylinders 36 and 38 will then force the scarfing tool 32 to make a scarf cut in the tube 100 as the tool holder 30 moves towards the second position. When the tool holder 30 is completely in the second position, the finishing tool force cylinder 96 will be actuated to drive the finishing tool 94 from the upper position towards the lower position to cut the tube 100. As the finishing tool 94 reaches the lower position, the finishing tool force cylinder 96 will be actuated to move the finishing tool 94 from the lower position to the upper position. As the finishing tool 94 reaches the upper position, the scarfing force tool cylinders 36 and 38 will be actuated to move the tool holder 30 and the scarfing tool 32 from the second position to the first position. As the tool holder 30 approaches the first position, it will unlock the lock mechanism 82 and then actuate the clamp mechanism 26 from the closed position to the open position, thereby releasing the tube 100 from the tube cutoff apparatus 20. After the tube 100 is released, the tube cutoff apparatus 20 will be decelerated and returned to its initial position along the predetermined path in preparation for the next cut.

In accordance with one method of operation, the tube cutoff apparatus 20 is maintained in a stationary position while a predetermined length of tube 100 is placed in the tube cutoff apparatus 20. Then, with the tube 100 stationary, the scarfing tool force cylinders 36 and 38 are initiated to drive the scarfing tool holder 30 and the scarfing tool 32 from the first position towards the second position. As the tool holder 30 moves from the first position towards the second position, it will actuate the clamp mechanism 26 into the closed position, thereby clamping the tube 100 to the tube cutoff apparatus 20. The scarfing tool force cylinders 36 and 38 will then force the scarfing tool 32 to make a scarf cut in the tube 100 as the tool holder 30 moves toward the second position. When the tube holder 30 is completely in the second position, the finishing tool force cylinder 96 will be activated to drive the finishing tool 94 from the upper position towards the lower position to cut the tube 100. As the finishing tool 94 reaches the lower position, the finishing tool force cylinder 96 will be activated to move the finishing tool 94 from the lower position to the upper position. As the finishing tool 94 reaches the upper position, the scarfing tool force cylinders 36 and 38 will be activated to move the tool holder 30 and the scarfing tool 32 from the second position to the first position. As the tool holder 30 approaches the first position, it will unlock the lock mechanism 82 and then actuate the clamp mechanism 26 from the closed position to the open position, thereby releasing the tube 100 from the tube cutoff apparatus 20. It will be appreciated that for this mode of operation the frame/carriage 28 is not required to provide the functions of a carriage and, therefore, is not required to be mounted on linear bearings 29 to the support/base 31.

It will be appreciated that by combining the clamp-actuating function with the scarf cut mechanism 22, a tube cutoff apparatus 20 has been provided which does not require a dedicated force cylinder for the clamping function.

We claim:

1. An apparatus for cutting a workpiece moving in a predetermined path relative to a support, said apparatus comprising:

a carriage;

means for mounting the carriage to a support for movement relative to a support to follow movement of a workpiece moving in a predetermined path;

clamping means on the carriage for clamping a workpiece to the carriage, said clamping means having an open position and a closed position;

first means on the carriage movable between a first position and a second position for making a scarf cut in a workpiece; and means for moving the clamping means from its open position to its closed position as an incident of the first means moving from its first position towards its second position.

2. The apparatus of claim 1 further comprising means on the carriage for making a finish cut in a workpiece.

3. The apparatus of claim 1 wherein the first means translates between the first position and the second position.

4. The apparatus of claim 1 wherein the clamping means translates between the open position and the closed position.

5. An apparatus for cutting a workpiece moving in a predetermined path relative to a support, said apparatus comprising:

a carriage;

means for mounting the carriage to a support for movement relative to a support to follow movement of a workpiece moving in a predetermined path; and clamping means on the carriage for clamping a workpiece to the carriage, said clamping means having an open position and a closed position;

first means on the carriage for selectively applying an actuating force;

means for transmitting an actuating force from the first means to the clamping means for urging the clamping means to the closed position, and primary means for maintaining the clamping means in the closed position in the absence of an actuating force being applied by the first means.

6. The apparatus of claim 5 wherein the first means comprises means for making a scarf cut in a workpiece clamped by the clamping means.

7. An apparatus for cutting a workpiece, said apparatus comprising:

a frame;

clamping means on the frame for clamping a workpiece to the frame, said clamping means having an open position and a closed position;

first means on the frame movable between a first position and a second position for making a scarf cut in a workpiece; and means for moving the clamping means from its open position to its closed position as an incident of the first means moving from its first position towards its second position.

8. The apparatus of claim 7 wherein the cooperating means comprises means for locking the clamping means in the closed position as an incident of the clamping means being moved from its open position to its closed position.

9. The apparatus of claim 8 wherein the cooperating means comprises means for unlocking the locking means as an incident of the first means moving from its second position towards its first position.

10. The apparatus of claim 9 further comprising means for selectively locking and unlocking the clamping means in the closed position as an incident of the first means moving between the first position and the second position.

11. The apparatus of claim 7 further comprising means for selectively locking and unlocking the clamping means in the closed position as an incident of the first means moving between the first position and the second position.

12. The apparatus of claim 7 wherein the cooperating means comprises means for moving the clamping means from its closed position to its open position as an incident of the first means moving from its second position towards its first position.

13. The apparatus of claim 7 further comprising means on the frame for making a finish cut in a workpiece.

14. The apparatus of claim 7 wherein the first means translates between the first position and the second position.

15. The apparatus of claim 7 wherein the clamping means translates between the open position and the closed position.

16. An apparatus for cutting a workpiece, said apparatus comprising:

a frame;

clamping means on the frame for clamping a workpiece to the frame, said clamping means having an open position and a closed position;

first means on the frame for selectively applying an actuating force, said first means including means for making a cut in a workpiece clamped by the clamping means;

means for transmitting an actuating force from the first means to the clamping means for selectively both urging the clamping means to the closed position and moving the clamping means from the closed position to the open position; and primary means for maintaining the clamping means in the closed position in the absence of an actuating force being applied by the first means.

17. An apparatus for cutting a workpiece, said apparatus comprising:

a frame;

clamping means on the frame for clamping a workpiece to the frame, said clamping means having an open position and a closed position;

first means on the frame for selectively applying an actuating force;

means for transmitting an actuating force from the first means to the clamping means for urging the clamping means to the closed position;

primary means for maintaining the clamping means in the closed position in the absence of an actuating force being applied by the first means; and secondary means for maintaining the clamping means in a closed position in the absence of an actuating force being applied by the first means.

18. An apparatus for cutting a workpiece, said apparatus comprising:

a frame;

clamping means on the frame for clamping the workpiece to the frame, said clamping means having an open position and a closed position;

first means on the frame for selectively applying an actuating force;

means for transmitting an actuating force from the first means to the clamping means for urging the clamping means to the closed position, the transmitting means comprising a slider-crank mechanism; and primary means for maintaining the clamping means in the closed position in the absence of an actuating force being applied by the first means.

19. The apparatus of claim 18 wherein the primary maintaining means comprises means cooperating between the slider-crank mechanism and the carriage to limit rotation of the slider-crank mechanism in a first direction.

20. The apparatus of claim 19 wherein the slider-crank mechanism rotates in the first direction as the clamping means moves from the open position to the closed position.

21. An apparatus for cutting a workpiece, said apparatus comprising:

a frame; and clamping means on the frame for clamping a workpiece to the frame, said clamping means having an open position and a closed position;

first means on the frame for selectively applying an actuating force;

means for transmitting an actuating force from the first means to the clamping means for urging the clamping means to the closed position and for moving the clamping means from the closed position to the open position; and primary means for maintaining the clamping means in the closed position in the absence of an actuating force being applied by the first means, the primary maintaining means comprising a locking link selectively engageable with the transmitting means to maintain the clamping means in the closed position.

22. The apparatus of claim 21 further comprising means cooperating between the first means and primary maintaining means for selectively engaging the locking link with the transmitting means.

* * * * *